Patented July 21, 1936

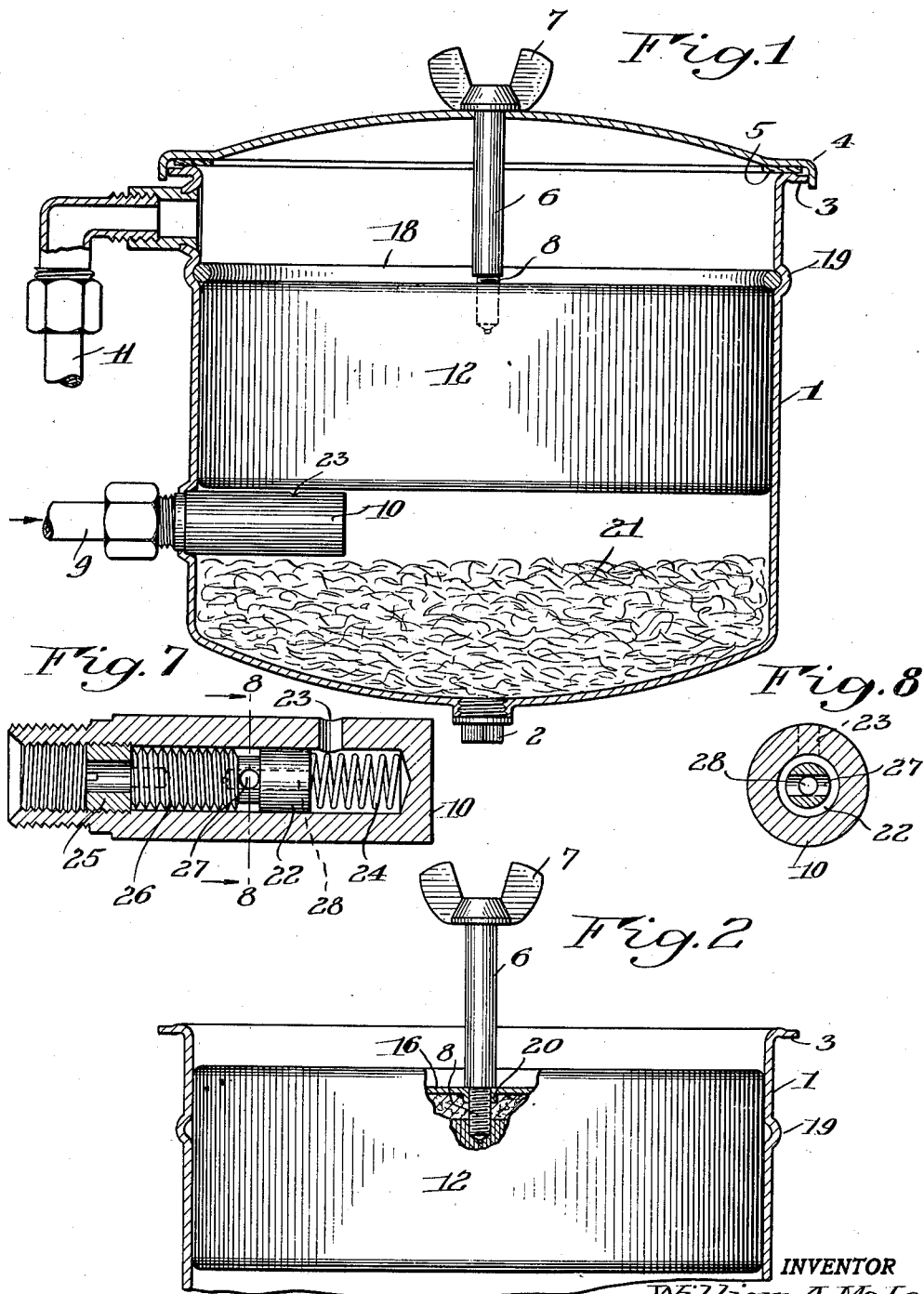

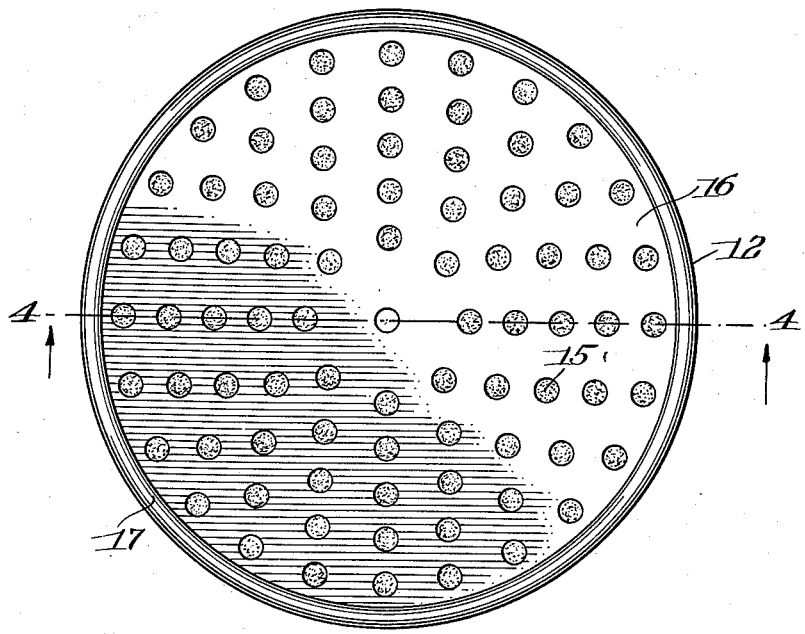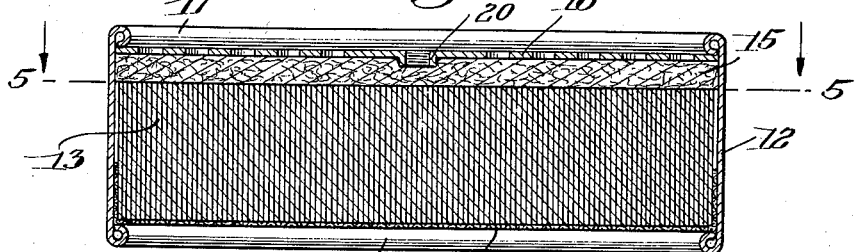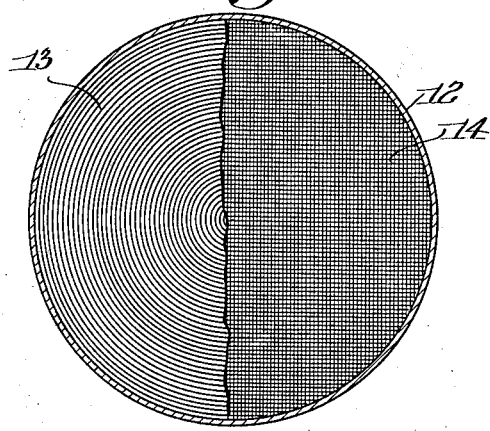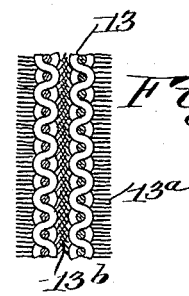

2,048,350

UNITED STATES PATENT OFFICE 2,048,350

FORCE FEED OIL FILTER

William A. McLean, Rochester, N. Y., assignor to C. Schnackel's Son, Inc., Rochester, N. Y., a corporation of New York Application February 27, 1933, Serial No. 658,696

2 Claims. (Cl. 210—165)

My present invention relates to filters and more particularly to lubricating oil filters of the type used in the lubricating lines of internal combustion engines to cleanse the oil during its circulation under pressure from the oil pump, and it has for its object to provide a simple, compact and efficient device of this character which can be quickly and conveniently taken apart for cleaning purposes and for the removal and renewal of the filtering medium. The improvements are directed in part toward the construction of this medium to the end that it may be prepared uniformly in quantities and used as a renewable part to be discarded when fouled and replaced by a fresh unit.

To these and other ends, the invention resides in certain improvements and combinations of parts, all as will be hereinafter more fully described, the novel features being pointed out in the claims at the end of this specification.

In the drawings:

Fig. 1 is a central vertical section through a filter constructed in accordance with and illustrating one embodiment of my invention, the filter unit or cartridge being shown in elevation;

Fig. 2 is a similar view of the upper portion of the tank showing the manner in which the filter cartridge is removed by using the securing means for the cover as a handle;

Fig. 3 is a top plan view of the cartridge removed;

Fig. 4 is a vertical section taken on the line 4—4 of Fig. 3, looking in the direction of the arrows;

Fig. 5 is a broken section taken on the line 5—5 of Fig. 4 looking in the direction of the arrows;

Fig. 6 is an enlarged fragmentary vertical section through two contiguous convolutions of the main filtering medium;

Fig. 7 is an enlarged vertical section through a pressure reducing valve that I prefer to employ in the inlet connection of the filter, and Fig. 8 is a vertical section taken on the line 8—8 of Fig. 7, looking in the direction of the arrows.

Similar reference numerals throughout the several views indicate the same parts.

This application discloses a further development of and improvement upon the general idea embodied in the subject matter of my prior and copending application, Serial No. 549,963, filed July 10, 1931, and this being the case, the general features common to both showings and particularly those claimed in the latter application need be only briefly described herein. The body of the filter consists, in the present instance, of a vertically arranged cylindrical tank 1 having a drain plug 2 in its dished bottom. The rim at the top is flanged at 3 and over it fits a flanged cover 4 with the use of an intermediate gasket 5 to tightly seal the tank. The cover is tightened in place by a bolt 6 extending through a central aperture therein and having a winged head 7 at the exterior, its inner end being reduced and threaded at 8 for the connection hereinafter described.

The intake oil pipe 9, that usually runs direct from the oil pump, is suitably connected to a side wall of the tank near the bottom to discharge through a suitable reducing valve 10 that compensates for pumps of different capacities and causes a uniform volume of flow and a maximum pressure within the tank suitable to the proportions of the filter. The outlet pipe 11 is suitably connected similarly near the top of the tank and, of course, delivers to the parts to be lubricated.

Intermediate these two connections, there fits closely within the tank a cylindrical unitary filtering medium, the casing of which is indicated at 12. This is the removable and replaceable or renewable "cartridge" heretofore referred to. In its preferred form, at the present writing, it consists of a strip of canton flannel wound into a tight roll 13 closely fitting in turn within the casing 12, so that its axis is vertical and its edges are presented to a flow of oil between the inlets and outlets. Stretched across the under face of the roll 13 is a head 14 of muslin or similar textile fabric, while on the top face is a relatively thick paper or similar fibrous disk 15. The consistency of this disk is not so light that it might be called flocculent nor is the pulp, on the other hand, compressed to the firmness of blotting paper, yet it is of a form-retaining stiffness. It resembles a thick filter paper. Upon this paper disk 15 is superposed a stiff foraminous metal disk 16, and the four elements thus assembled, namely, 14, 13, 15, and 16, are held within the casing or shell 12 between beads 17 formed by crimping over both upper and lower rims thereof. The said casing 12 is preferably made of heavy cartridge paper and the unitary assembly is not unlike a shotgun shell.

The cartridge need not be supported at the bottom as the pressure of the oil is from below, but its position in this respect, as it is pushed into the tank, is at least limited by the check valve casing 10. Its upward movement is prevented, however, beyond a determined position by an expanding split spring ring forming a familiar type of locking abutment 18 that engages the upper bead 17 of the cartridge and seats in an annular indentation 19 in the wall of the tank. The reduced end 8 of the hand operated bolt 6 threads into a central aperture 20 in disk 16 and secures the cover 4 tightly in place, the cartridge reacting against the lock ring, as aforesaid. When it is desired to replace the cartridge with a fresh one, as happens when long use or extremely dirty oil is being treated, the bolt and cover are removed together, the ring 18 is contracted and removed and then, as shown in Fig. 2, the bolt is screwed back into the disk 16 and constitutes a stem or handle, by means of which the cartridge is conveniently withdrawn.

The general functioning of the device as a filter is obvious. As taught in my copending application above referred to, a body of metallic wool 21 preferably occupies the bottom of the tank below the inlet 9—10, which body traps the heavier particles of foreign solid matter in the oil. The latter is thence forced through the muslin drum 14, which both strains and acts as a retainer for confining ravelings on the edges of the roll 13. As shown in Fig. 6, the pile 13ª on the flannel strip interlaces, as indicated at 13ᵇ, on contiguous convolutions providing a finer filtering medium, while the filter paper 15 above contributes a last effective cleansing before the oil passes out.

The details of the reducing valve 10 are not pertinent to the above described invention but, as shown in Figs. 7 and 8, it may consist of a vibratory plunger 22 within the cylinder casing 10, which latter has an outlet 23. A spring 24 normally holds the plunger from this outlet, while its movement in the opposite direction is limited by a ring nut or threaded inner sleeve 25. After passing through this nut, the oil finds a tortuous passage around cross threads 26 on one portion of the plunger, eventually passing through a transverse opening 27 to a core opening 28, shown in dotted lines, and thence to the discharge port 23. A pressure greater than the tank is designed to withstand or is necessary to the feed forces the plunger ahead against the spring and closes port 23 until the pressure in the tank is relieved at the outlet and the plunger can reach its normal balance again.

I claim as my invention:

1. In a force feed oil filter or the like, the combination with a tank having a discharge connection and an intake connection, of a detachable and replaceable unitary filter cartridge therefor embodying a casing containing a filtering medium, means for securing the cartridge firmly in the tank between said connections, a cover for the tank, and a detachable device securing the cover to the cartridge, said device being adapted to be reengaged with the cartridge when the cover is removed to extract the cartridge from the tank.

2. In a force feed oil filter or the like, the combination with a tank having a discharge connection and an intake connection, of a detachable and replaceable unitary filter cartridge therefor embodying a continuous cylindrical casing closely fitting within the tank walls between said connections and containing a strip of fibrous absorbent material wound into a tight roll on the cylindrical axis and a foraminous disk at one end of the roll, said disk being provided with a threaded opening, means for securing the cartridge firmly in the tank between said connections, a cover for the tank, and a detachable threaded device securing the cover to the disk, said device having an exterior handle and being adapted to be secured back into the disk when the cover is removed and detached thereform to extract the cartridge from the tank.

WILLIAM A. McLEAN.